United States Patent [19]
Blomfield-Brown et al.

[11] Patent Number: 5,742,773
[45] Date of Patent: Apr. 21, 1998

[54] METHOD AND SYSTEM FOR AUDIO COMPRESSION NEGOTIATION FOR MULTIPLE CHANNELS

[75] Inventors: Christopher Blomfield-Brown, Seattle; Robert David Donner, Redmond; Jeffrey Eames Taylor, Bellevue, all of Wash.

[73] Assignee: Microsoft Corporation, Redmond, Wash.

[21] Appl. No.: 634,243

[22] Filed: Apr. 18, 1996

[51] Int. Cl.$^6$ ...................................................... H04L 5/00
[52] U.S. Cl. ................. 395/200.58; 341/61; 358/426; 370/263; 370/441; 370/479; 395/200.77; 704/500
[58] Field of Search ................. 341/50, 61; 358/426; 370/263, 342, 345, 441, 442, 479, 498; 704/500; 395/200.77, 200.58

[56] References Cited

U.S. PATENT DOCUMENTS

| | | | |
|---|---|---|---|
| 5,457,685 | 10/1995 | Champion | 370/260 |
| 5,508,733 | 4/1996 | Kassatly | 348/13 |
| 5,546,395 | 8/1996 | Sharma et al. | 370/468 |
| 5,590,128 | 12/1996 | Maloney et al. | 370/260 |
| 5,600,649 | 2/1997 | Sharma et al. | 370/435 |
| 5,606,599 | 2/1997 | O'Mahony et al. | 379/93 |

OTHER PUBLICATIONS

Rosch, *The Winn L. Rosch Multimedia Bible*, Premier Edition, Sams Publishing (1995), pp. 227-297, 511-554.

*Primary Examiner*—Kenneth S. Kim
*Attorney, Agent, or Firm*—Klarquist Sparkman Campbell Leigh & Whinston

[57] ABSTRACT

Modem-equipped computers which can initiate an audio channel using the modem data connection. The connection is initiated with a new protocol called the voice-over-data protocol. The new protocol does not require any additional modem hardware or telephone line features, and is not tied to any proprietary hardware/software compression or transmission schemes. The voice-over-data protocol negotiates an audio compression/decompression scheme and then sets up an audio channel over an existing data connection using a socket. Compressed audio data is then delivered to the remote computer where it is decompressed and output. The voice-over-data protocol significantly reduces the latency which disrupts normal speech patterns when voice data is sent over a data connection. This protocol also reduces the bandwidth required to send voice over a data connection.

17 Claims, 13 Drawing Sheets

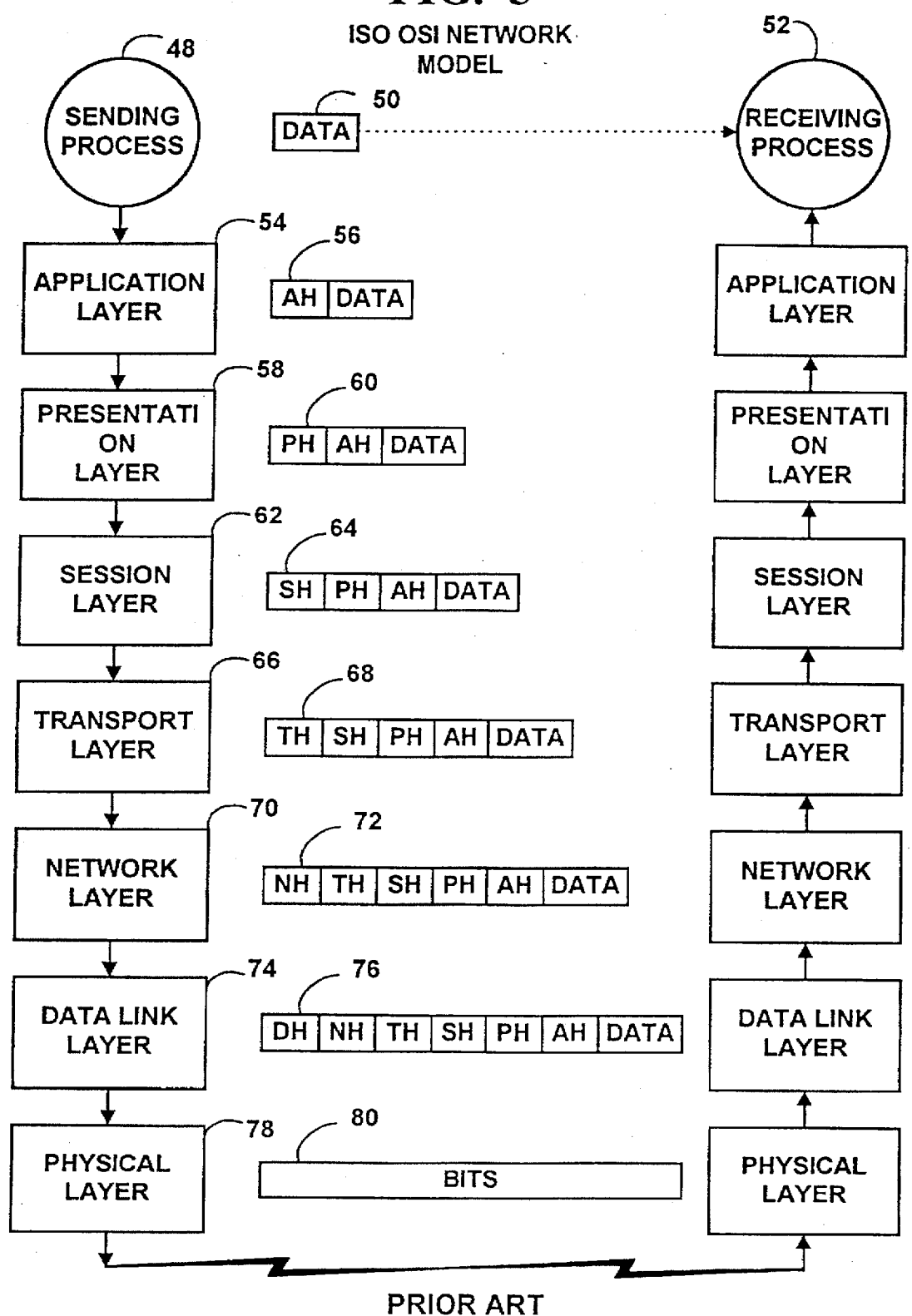

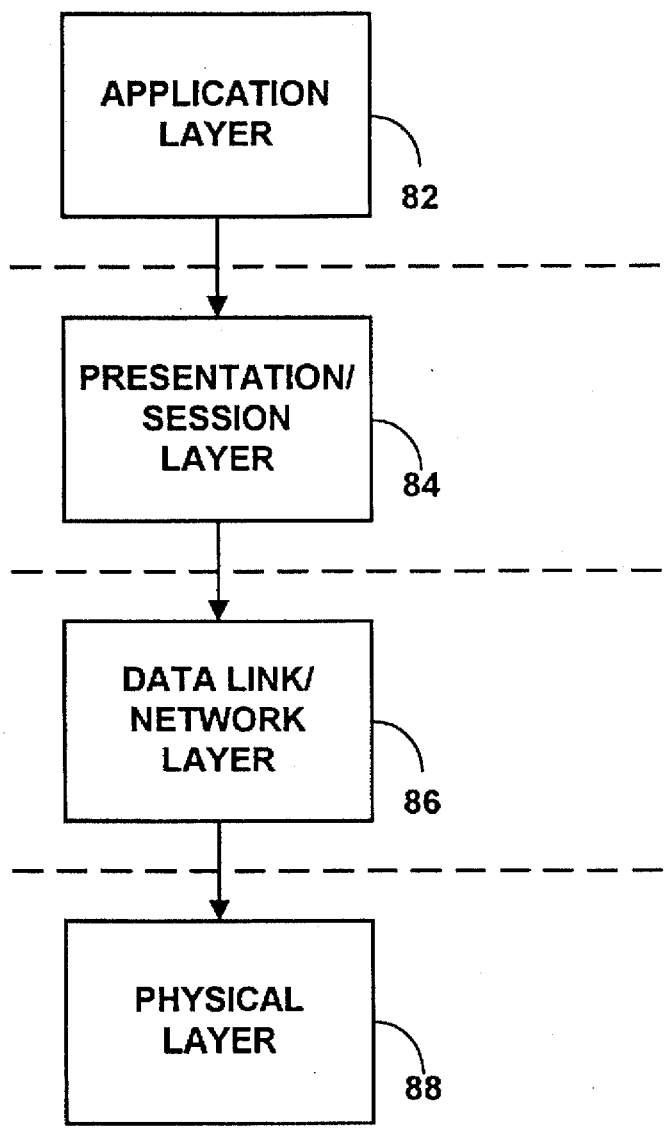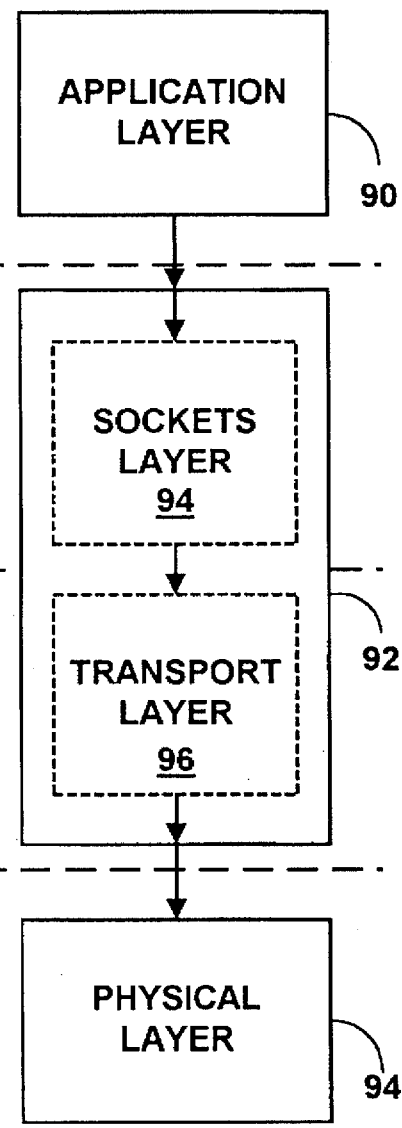

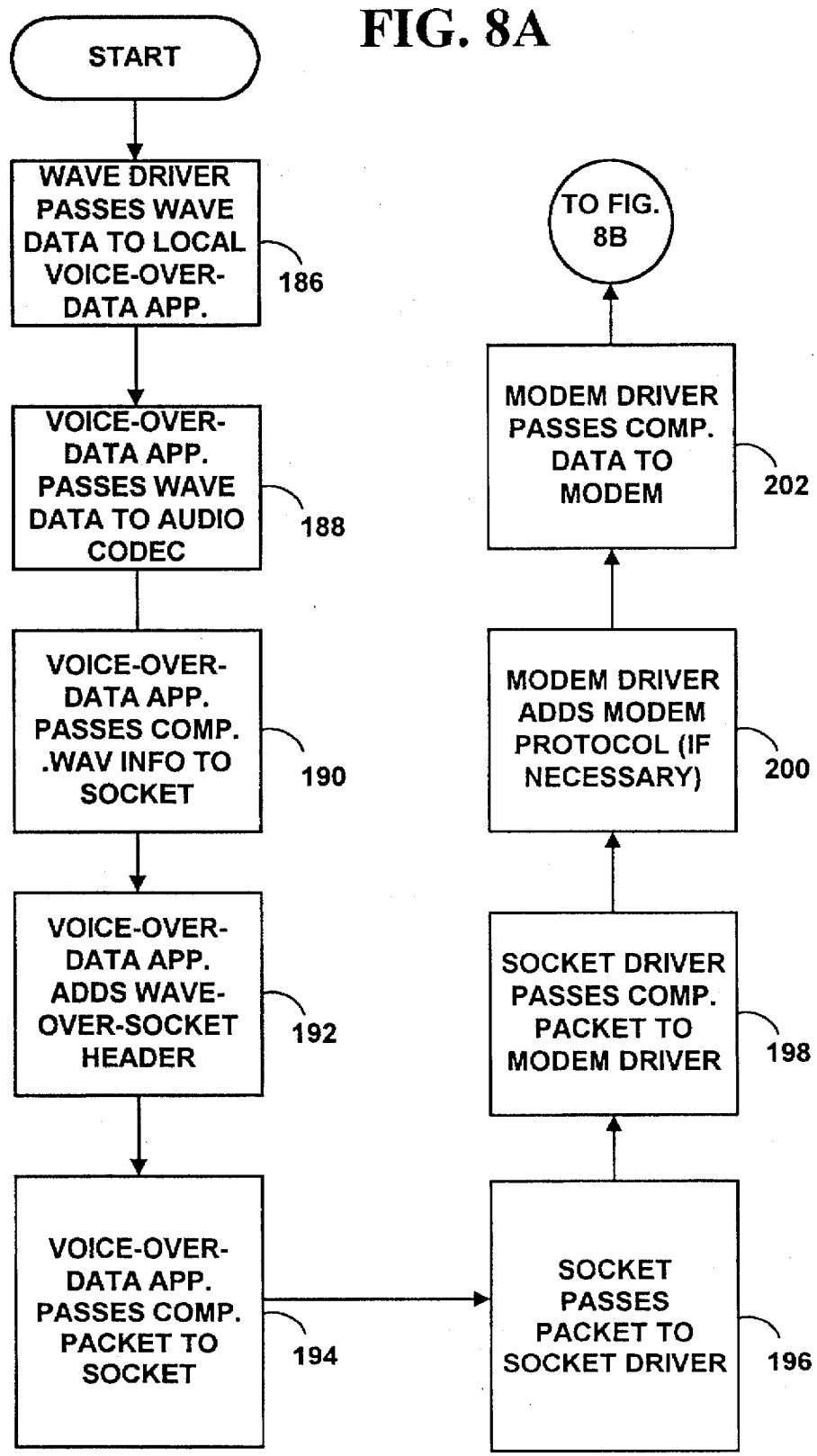

METHOD AND SYSTEM FOR AUDIO COMPRESSION NEGOTIATION FOR MULTIPLE CHANNELS

FIELD OF THE INVENTION

This invention relates generally to the field of computer communications. More specifically, it relates to a method and system providing simultaneous transmission of voice/audio and data with standard communication devices.

BACKGROUND AND SUMMARY OF THE INVENTION

In today's world, modems are commonly used to connect a computer at one location to a computer at another remote location. A majority of computer users use a modem to establish a data connection directly to another computer, or to a computer which allows access to a network of computers (e.g., the Internet). The modem connection is typically made over a telephone line (e.g., a plain old telephone service (POTS) line) that is normally used for voice calls. The user modem data connection to another computer is typically a data connection that does not permit voice traffic. If a user wants to talk with anyone, the data connection must be dropped, and a voice connection established. When the voice conversation is finished, the voice connection is dropped, and the data connection must then be re-established, a tedious and time consuming process.

It is desirable for many types of applications to allow a voice connection to co-exist on the same telephone line that is being used as a data connection between two modems. This voice connection can be used for a number of purposes, such as permitting a user to get live help from a support organization after calling a support bulletin board, to order merchandise after viewing an electronic catalog, to play an interactive game with another computer user, etc. Since voice transmission can generate large bursts of voice information, compression/decompression techniques are typically required to speed the transmission of voice information. However, most packet networks with modem connections are simply not capable of transmitting effective voice communications in real-time (even with compression/decompression) over a data connection that has been established between two computers due to high latency (i.e., time delays of 200–500 milliseconds) and limited bandwidth.

It is also desirable for an application (e.g., a computer game, an electronic music store, etc.) to transmit high fidelity audio along with data. As the transmission speed of modems increases (e.g., from 9600 and 14,400 (14.4) to 28,800 (28.8) bits-per-second), it is now possible to routinely add high fidelity audio to applications. A voice channel (or audio channel) could be used to transmit this high fidelity audio associated with the application. High fidelity audio data also requires compression/decompression techniques be used since the amount of high fidelity audio data sent can be quite large. However, as was described above for voice, real-time latency and bandwidth problems prevent most packet networks with modem connections from transmitting high fidelity audio over a data connection.

There have been many attempts to permit voice/data and/or high fidelity audio/data to be transmitted on the same telephone line used to make a modem connection. One example of voice/data transmission is the Voice View™ modem by Radish Communications Systems, Inc. of Boulder, Colo., which uses software to permit alternating voice and data (AVD). At any one time, voice or data can be transmitted over the connection between the two modems. However, voice communications are awkward for users since the voice channel stops when data is sent. An additional problem is that both ends of the connection must have the special Voice View™ Modems. If Voice View™ Modems aren't present on both ends, then the alternating voice and data connection is not possible.

Another technique used to overcome the voice/data problem is using simultaneous voice and data (SVD) modems developed by the Intel®, Rockwell®, Multitech®, and others. The SVD modems use special modem hardware to provide simultaneous voice and data over a telephone line at any instant of time. The simultaneous voice and data modems allow a single channel of voice (or audio) to co-exist with a data stream. However, multiple channels of voice are not supported. Moreover, this solution requires significant computational abilities in the modem hardware to compress/decompress, multiplex/demultiplex the voice data stream, as well as a protocol for mixing the data and voice/audio streams. The special modem hardware significantly increases the cost of the modem, and uses proprietary compression and protocol schemes which are incompatible with most other existing modem hardware. As a result, both ends of the connection must have the specially-equipped modems to permit simultaneous voice/audio and data traffic over a single telephone line. In addition, not all SVD modems are compatible with other SVD modems (e.g., a Multitech® SVD modem will not communicate with an Intel® SVD modem).

Another variety of the simultaneous voice and data "modems" is an Integrated Services Digital Network (ISDN) device. ISDN devices provide simultaneous voice and data transmission, but are significantly more expensive than a standard modem. In addition, ISDN devices typically require a special telephone line (i.e., an ISDN line) to take full advantage of the ISDN modem features. To use simultaneous voice and data, a user needs an ISDN device, and an ISDN telephone line (which requires an additional monthly fee) instead of a normal telephone line.

Half-duplex voice has also been used to provide voice traffic over a data connection on a broadcast computer network such as the Internet. However, these half-duplex network products (e.g., such as the InternetPhone™) do not allow an immediate transition between speaking and listening. This dramatically interrupts natural speech patterns. The variations in the time required to send data (including voice data) across a broadcast computer network such as the internet (e.g., over 1 second), make it virtually impossible to overcome latency during a voice connection.

In accordance with a preferred embodiment of the present invention, the simultaneous voice/audio and data problem using standard modems is overcome. A new protocol, called the "voice-over-data protocol", provides simultaneous, full-duplex voice and data over a standard modem data connection, using a single telephone line. The voice-over-data protocol does not require any new, special, or proprietary modem hardware, and utilizes Sockets, a standard operating system communication component for the transport.

Voice-over-data uses a combined single protocol to handle both voice/audio and data. The voice-over-data protocol is designed to allow a variety of non-proprietary compression/decompression techniques to be used for simultaneous voice/audio and data transfer, and also provides the capability for multiple voice/audio channels to be transmitted over a single telephone line. This new protocol dramatically improves the latency between the speaker and the listener (i.e., the time delays are reduced to 50–100 milliseconds), allowing for more natural speech patterns.

The foregoing and other features and advantages of the preferred embodiment of the present invention will be more readily apparent from the following detailed description, which proceeds with reference to the accompanying drawings.

BRIEF DESCRIPTION OF THE DRAWINGS

FIG. 3 is a block diagram showing the prior art ISO network reference model.

FIG. 4A is a block diagram which illustrates stripped down version of the OSI network model.

FIG. 4B is the preferred embodiment model for the present invention.

FIGS. 8A, 8B and 8C together is a flow chart which illustrates how compressed audio information is sent from a local computer to a remote computer.

DETAILED DESCRIPTION OF A PREFERRED EMBODIMENT

Figure 1:
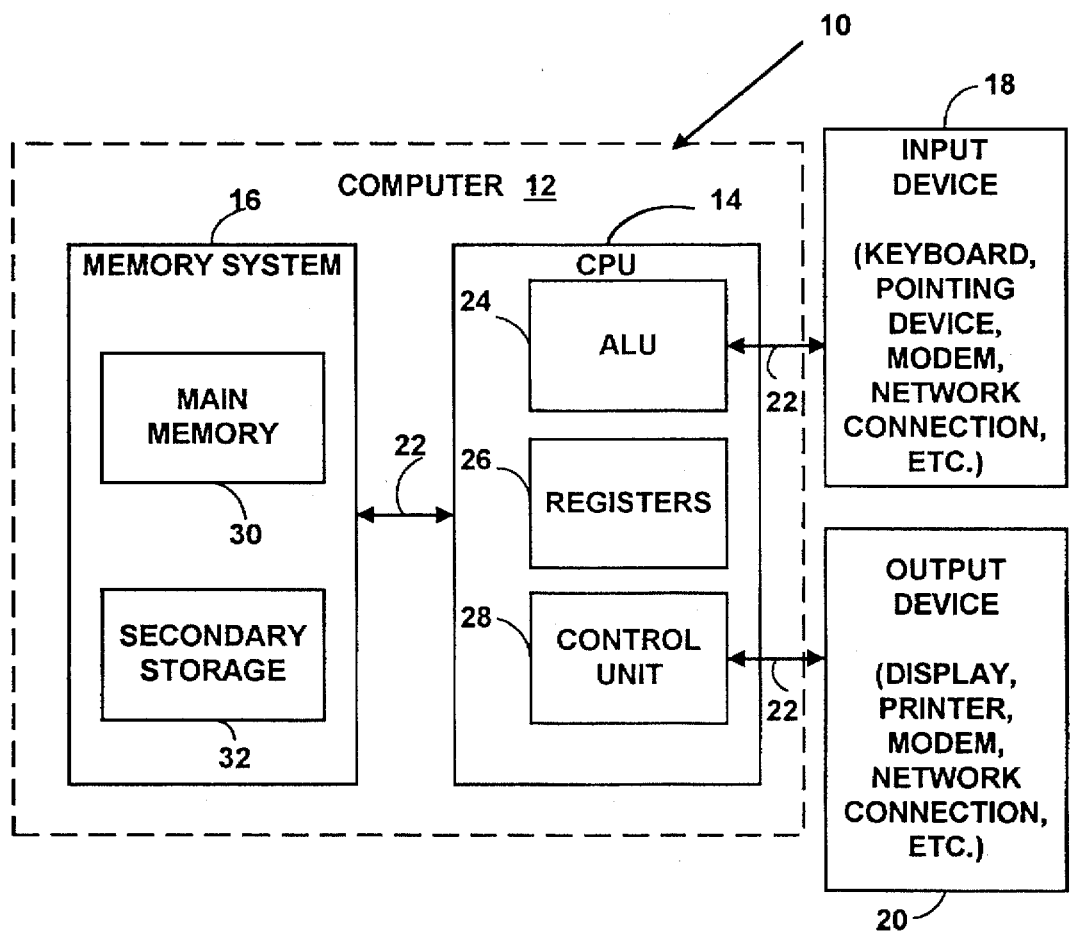
FIG. 1 is a block diagram of a computer system used to implement a preferred embodiment of the present invention.

Referring to FIG. 1, an operating environment for the preferred embodiment of the present invention is a computer system 10 with a computer 12 that comprises at least one high speed processing unit (CPU) 14, in conjunction with a memory system 16, an input device 18, and an output device 20. These elements are interconnected by a bus structure 22.

The illustrated CPU 14 is of familiar design and includes an ALU 24 for performing computations, a collection of registers 26 for temporary storage of data and instructions, and a control unit 28 for controlling operation of the system 10. Any of a variety of processors, including those from Digital Equipment, Sun, MIPS, IBM, Motorola, NEC, Intel, Cyrix, AMD, Nexgen and others are equally preferred for CPU 14. Although shown with one CPU 14, computer system 10 may alternatively include multiple processing units.

The memory system 16 includes main memory 30 and secondary storage 32. Illustrated main memory 30 is high speed random access memory (RAM) and read only memory (ROM). Main memory 30 can include any additional or alternative high speed memory device or memory circuitry. Secondary storage 32 takes the form of long term storage, such as ROM, optical or magnetic disks, organic memory or any other volatile or non-volatile mass storage system. Those skilled in the art will recognize that memory 16 can comprise a variety and/or combination of alternative components.

The input and output devices 18, 20 are also familiar. The input device 18 can comprise a keyboard, mouse, pointing device, sound device (e.g., a microphone, etc.), or any other device providing input to the computer system 10. The output device 20 can comprise a display, a printer, a sound device (e.g., a speaker, etc.), or other device providing output to the computer system 10. The input/output devices 18, 20 can also include network connections, modems, or other devices used for communications with other computer systems or devices.

As is familiar to those skilled in the art, the computer system 10 further includes an operating system and at least one application program. The operating system is a set of software which controls the computer system's operation and the allocation of resources. The application program is a set of software that performs a task desired by the user, making use of computer resources made available through the operating system. Both are resident in the illustrated memory system 16. In accordance with the practices of persons skilled in the art of computer programming, the present invention is described below with reference to acts and symbolic representations of operations that are performed by computer system 10, unless indicated otherwise. Such acts and operations are sometimes referred to as being computer-executed.

It will be appreciated that the acts and symbolically represented operations include the manipulation by the CPU 14 of electrical signals representing data bits which causes a resulting transformation or reduction of the electrical signal representation, and the maintenance of data bits at memory locations in memory system 16 to thereby reconfigure or otherwise alter the computer system's operation, as well as other processing of signals. The memory locations where data bits are maintained are physical locations that have particular electrical, magnetic, optical or organic properties corresponding to the data bits.

Figure 2:
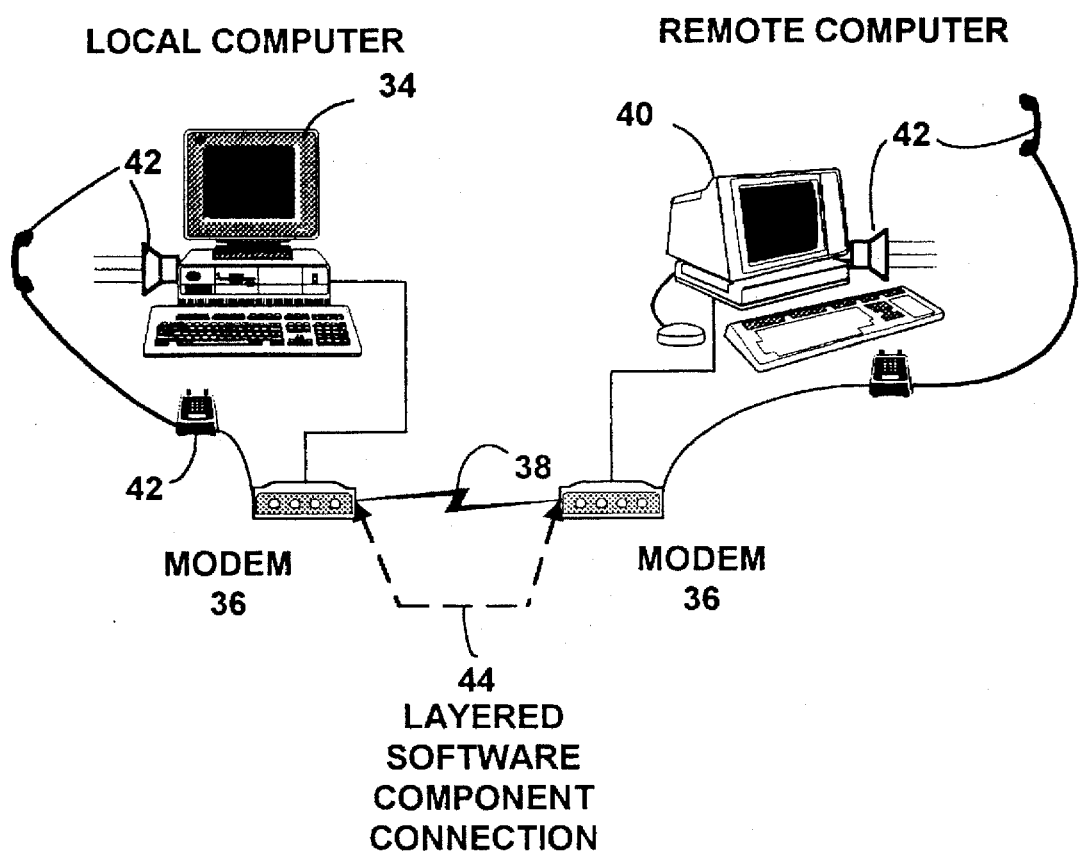
FIG. 2 is a block diagram illustration of the computer equipment and connections which can be used for the illustrated embodiment of the present invention.

As is shown in FIG. 2, the illustrated embodiment of the present invention includes a pair of computers (34,40) each with an associated modem 36, coupled via over a communications link 38 to a remote computer 40. The modems 36 are standard high speed modems of the sort made by Hayes®, U.S. Robotics®, Motorola®, Multi-Tech™, Zoom™, Practical Peripherals™, etc., for use on a standard (i.e., not specialized) telephone line. However, specialized modems or other communication devices (e.g., ISDN, etc.) and specialized telephone lines (e.g., ISDN, etc.) can also be used. The modem may be an external modem 36, or an internal modem (not shown in FIG. 2) connected to either a serial or parallel port on the computer. The communications links 38 are standard telephone lines. The user and remote computers each have audio devices 42 (e.g., a telephone, speaker, microphone, etc.) through which a user can send/receive voice and/or audio information.

The local computer 34 and the remote computer 40 have an operating system such as 4.x Berkeley UNIX™, Windows® 95, Windows NT™, etc. which supports sockets as a mechanism for communications. The operating system permits a plurality of application programs to be run, and also permits a local application program to communicate with a remote application program through a layered software communication component 44.

When communication is established between two computers, a layered communications hierarchy is often used. One layered communications hierarchy commonly used is the ISO OSI reference model which is known in the art. The OSI network reference model is a layered model for network communications. The purpose of each layer is to offer certain services to the higher layers, while shielding higher layers from the details how the services offered by lower layers are actually implemented. Each layer performs a well defined function. The layer boundaries are chosen to minimize the information flow across the layer interfaces. The functionality of each layer is generic enough to handle a large number of diverse situations.

FIG. 3 shows an example of how data can be transmitted using the OSI model known in the art. A sending process 48 has some data 50 it wants to send to the receiving process 52. The sending process gives the data 50 to the application layer 54 on the sending side, which attaches to the data an application header 56, and then gives the resulting item to the presentation layer 58. The presentation layer processes, and may transform, the item, adds a presentation header 60, and passes the item to the session layer 62. This process is repeated in the session layer 62, which adds a session header 64; the transport layer 66, which adds a transport header 68; the network layer 70, which adds a network header 72; and the data link layer 74, which adds a data link header 76. When the data with all the attached headers finally reaches the physical layer 78, it is transported to the receiving computer as bits 80 over some physical medium. On the receiving computer, the various headers which were added on the sending side are systematically stripped off one by one at each corresponding layer on the receiving side until the original data item 50 reaches the receiving process 52.

The entities in OSI layer N implement a service used by layer N+1 (with physical layer being Layer 1). Services implemented by a layer are available at service access points (SAPs). The layer N SAPs are the places where layer N+1 can access the services offered. In an operating system which support sockets, one variety of a SAP is the socket, and the SAP address corresponds to the socket identifier.

As can be seen from FIG. 3, if the full OSI model is implemented for network communications, there is substantial processing overhead for two computers to communicate, even if the amount of data they send is small. As a practical matter, as is shown in FIG. 4A, many operating systems combine the presentation and session layers 84, the transport and network layers 86 and the data link and physical layers 86. Even in this reduced configuration, however, processing overhead in the combined presentation/session layer and in the network/data link layers can be very large. Data throughput is further slowed because these layers are typically generic enough to allow communication over a wide variety of different transport mediums, necessarily entailing connecting to a wide variety of different types of computer networks.

Even using the reduced layered communications scheme shown in FIG. 4A, most attempts to implement simultaneous voice/audio and data over standard modem hardware have failed since the processing time within the layers (especially across broadcast networks using bridges and routers) makes the latency time for speech and other audio so large that normal speech patterns are impractical. In addition, using software compression/decompression techniques within the layered communications scheme in FIG. 4A has not improved the bandwidth problems since there is still substantial processing overhead associated with executing software designed to handle communications with a wide variety of transport mediums.

In the preferred embodiment of the present invention, a new approach to the layered communications scheme was developed. This new scheme addresses both the latency and bandwidth problems associated with voice/audio transmission. As shown in FIG. 4B, the application layer 90 sits in the new scheme on top of a new presentation layer 92. The new presentation layer 92 includes a socket layer 94 and a transport layer 96. The presentation layer 92 sits on top of the physical layer 94.

The presentation layer 92 has been modified to handle only one type of communications, namely socket communications. All functionality that does not directly relate to socket communications has been stripped out and discarded. This makes the presentation layer 92 small, compact, efficient, and very fast.

In addition, not all possible socket types are used. Only two socket types, the datagram socket, and the raw socket, are used for audio data transfer. The datagram socket provides unreliable (i.e., no acknowledgements (ACKs) or guaranteed delivery), unsequenced, data transfer. The raw socket provides direct access to the underlying communications protocols (e.g., modem protocols), and is also unreliable and unsequenced. The datagram and raw sockets are different than the stream socket which is normally used for communications since the stream socket provides reliable, (acknowledged and guaranteed) sequenced data transfer.

The use of a datagram (or raw) socket without acknowledged data transfer helps eliminate a large portion of the latency often encountered with prior art network communications schemes. Since the socket does not have to wait for acknowledgements or data sequencing, the voice/audio data can be transmitted at a faster rate, making the latency periods significantly smaller than would be possible using an acknowledged data transfer. The tradeoff for using unreliable data transmission to improve latency is that a user may hear a garbled word from time to time, or noise on the line during voice or other audio transmission. However, this is usually preferable to the latency problems discussed above which disrupt normal speech patterns.

When a user wishes to establish an audio (e.g., voice or high fidelity audio) channel connection using a modem which already has an established data connection, a voice-over-data application is started on the local computer.

Figure 5:
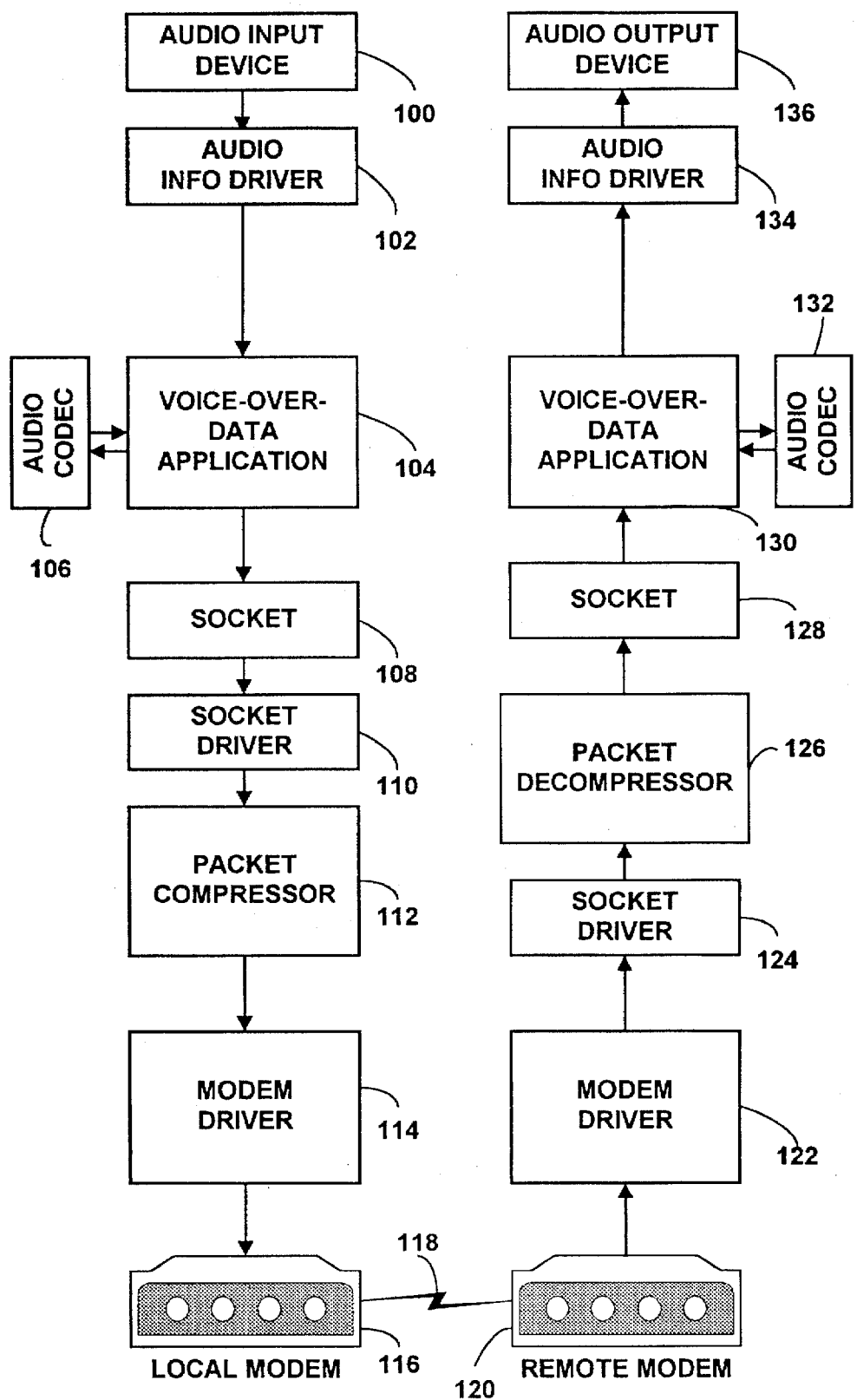
FIG. 5 is a block diagram which illustrates data flow from a local audio input device to a remote audio output device.

This voice-over-data application creates a channel through a socket interface. As is shown in FIG. 5, when there is voice activity at an originating local audio input device 100 (i.e., microphone, telephone, etc.), the audio device produces low voltage audio signals. The audio signals are typically fed through an analog-to-digital converter (ADC) (e.g., on a sound board), which samples the audio signal thousands of times per seconds and translates the analog audio information into digital format (i.e., 1's and 0's). The faster the sampling rate, and/or the larger the word size used to sample the analog signal, the better the quality of the output sound.

For example, an 8 KHz sampling rate is used for telephone quality voice transmission, 22 KHz is used for AM and FM radio sound quality, and 44.1 KHz is used for CD (high fidelity) sound quality. Most sound boards permit a minimum of 11 KHz, 22 KHz, and 44.1 KHz sampling (so 11 KHz sampling is typically used for voice transmission).

A audio codec is a combination of an audio coder and decoder (i.e., audio compressor/decompressor). In the preferred embodiment of the present invention, the True Speech™ audio codec by the DSP Group of Santa Clara, Calif. is used. However, any audio codec known in the art (e.g., GSM 6.10 Audio Codec, CCITT G.711 A-Law and u-Law codec, ADPCM codec, etc.) can be used in place of the DSP Group codec. The DSP Group audio codec is capable compressing and decompressing data using a number of different compression/decompression formats typically achieving compression ratios of up to 8:1.

Audio data needs to be compressed in the codec since just a few seconds of audio input generates a huge amount of audio data, and as much audio information as possible must be transmitted in a given bandwidth to avoid the latency problems discussed above. For example, for low fidelity audio using an 11 KHz sampling rate with 16-bit sampling resolution, a continuous 60 second sound sample produces about 1.32 mega-bytes (MB) of data. However, for high fidelity audio, using a 44.1 KHz sampling rate with 16-bit sampling resolution, about 705,600 bits of data are produced every second, or about 53 MB of data per minute. As a result, it is necessary to compress audio data to permit fast transmission.

Returning to FIG. 5, on receiving an audio signal, an audio information driver 102 sends uncompressed audio information to a local voice-over-data application 104.

In the preferred embodiment of the present invention, a WAVE audio information driver is used. However, any other audio information drivers could be also used in place of the WAVE audio information driver. The WAVE audio information driver outputs audio information in the .WAV format, as is known to those in the art. The .WAV format stores digitally sampled waveforms from one or more channels and permits a variety of sampling rates and bit resolutions depths to be used. The .WAV format can store compressed as well as uncompressed sampled audio signal data. When there is activity at the local audio input device 100, a plurality of uncompressed .WAV format packets are sent to the WAVE driver by the audio hardware.

The WAVE driver 102 passes the .WAV information to the local voice-over-data application 104. After receiving this initial data, the voice-over-data application 104 establishes a datagram (or raw) socket connection through a socket 106 (the details of which will be explained below) with a remote voice-over-data application on a remote computer and negotiates a compression format.

For example, the local voice-over-data application may send the compression format (specific, e.g., by sampling rate, bit resolution, etc.) to the remote voice-over-data application. If a requested compression format is not available on a remote codec on the remote machine, the remote voice-over-data application will reject the request.

The local voice-over-data application will continue to send compression format requests until the remote application accepts a compression format request, or the local application exhausts all of its known codec compression formats. If a compression format can't be negotiated, then the socket connection is closed, and an error message printed for the user. The details of the negotiation scheme will also be explained in more detail below.

Each voice-over-data application maintains a listing of all known compression/decompression formats that the application is capable of using. If a user desires to replace any existing audio codec, then the listing of compression formats in the voice-over-data application is updated. The listing of known compression/decompression formats in the voice-over-data application provides a flexible scheme which makes it relatively easy to substitute in a new audio codec at any time, without changing the voice-over-data application.

Once the voice-over-data application 104 has negotiated the proper compression scheme, it contacts a local audio codec 106 to use the negotiated compression format to compress audio input data.

Once the socket connection is established and the compression format has been negotiated, the voice-over-data application takes the uncompressed .WAV data packets sent to it by the audio information driver (i.e., the WAVE driver) 102 and sends them to the audio codec 106 for compression.

The audio codec 108 then sends the compressed .WAV data to a socket (datagram or raw) 106, which is used to transport the audio data. Since the voice-over-data application 104 sends the audio data to a socket 108, the underlying communications technology (i.e., the modem driver and modem in this case) can be replaced with other connection technologies (e.g., a network TCP/IP, PPP, SLIP interfaces, etc.). The socket has an associated modem socket driver 110. Before the datagram socket packet is sent, the voice-over-data application 104 adds a special socket header, called the "wave-over-socket header," and sends the socket packet to the socket 108, which sends it to the socket driver 110, which sends it to a packet compressor/decompressor 112. The packet compressor/decompressor 112 uses a lossless data compression scheme, such as the LZS variant of the Lempel Ziv technique, to compress the packet header information to create a socket compressed packet. However, other lossless compression schemes could also be used.

A socket interface also has the capability of handling multiple input data streams. As a result, the socket 108 provides a standard way to mix not only audio, video and data, but multiple audio streams as well. This feature has a variety of important uses, including giving location cues for video conferencing applications (i.e., giving an auditory indication of the location of the person speaking on the display device), and providing full spatial imaging.

For example, a video conferencing application may provide a window on a computer display for each party connected to the video conference call for a user. The windows allow a user to see and hear all the other parties which are part of the video conference call. Location cues are desirable for video conferencing since at any instance of time, one of more of the parties to the video conference will be silent. When a silent party begins to speak, an immediate cue to the location of the party who has started to speak is provided. The user can then immediately focus his/her attention to the speaker who was previously silent. Location cues help provide more natural speech patterns during video conferencing since a user does not have to spend time scan the various video conference party windows to determine which party has started to speak. Full spatial imaging uses two or more audio channels to convey a wide spectrum of audio source location information.

The packet compressor 112 compresses uses the LZS variant compression scheme to compress the packet header (e.g., 60 bytes) down to header size of one-tenth the original size (e.g., 6–8 bytes). However, the packet compressor could also compress the packet header to a larger or smaller header size. In one embodiment of the present invention, the codec compressed .WAV data packet is also compressed again, but since the audio data has been compressed once already by the codec, this second compression does not significantly reduce the size of the codec compressed .WAV data. However, compressing the codec compressed .WAV packet again is not necessary on most communications connections and can be skipped to further improve latency. The compressed packet is now a socket compressed packet.

Compressing the packet header significantly improves the bandwidth for the audio connection. When there is actual audio data, compression makes the packet header smaller in size, allowing faster transmission in the limited bandwidth available. When there is no audio data (e.g., momentary silence during a voice connection), the datagram packet sent (i.e., the packet header with a few data bytes indicating silence) is significantly smaller (e.g., 6–8 bytes instead of 60), which dramatically increases transmission rates.

The socket compressed datagram packet is then passed to a modem driver 114. The modem driver 114 adds any necessary modem specific protocol to the packet. The packet is then passed to a local modem 116 for transmission 118 to a remote modem 120. In addition, the local modem 116 can also compress the socket compressed packet before transmission.

When the data arrives on the remote modem 120, it follows a path which is the reverse of the path just described. Any modem specific protocol is stripped off by a remote modem driver 122, and the compressed packet is passed to a remote socket driver 124. The remote socket driver 124 passes the compressed packet to the remote packet decompressor 126, and the remote packet decompressor 126 decompresses the packet header. The decompressed packet header and compressed .WAV data is passed to a remote socket driver 126. The packet returned to the socket contains the codec-compressed .WAV audio information along with a decompressed wave-over-sockets header. The codec compressed audio information is passed to a remote voice-over-data application 130. The remote voice-over-data application 130 then strips the decompressed wave-over-socket header. The remote voice-over-data application 130 sends the codec-compressed audio packet to a remote audio codec 132 along with the appropriate decompression format to use for decompression. The remote audio codec 132 decompresses the compressed audio packet using the appropriate decompression format. The remote audio codec 132 passes the decompressed audio packet to the audio information driver 134 (e.g., a WAVE driver) a remote which passes the audio information to a remote audio output device 136 for output.

Figure 6A:
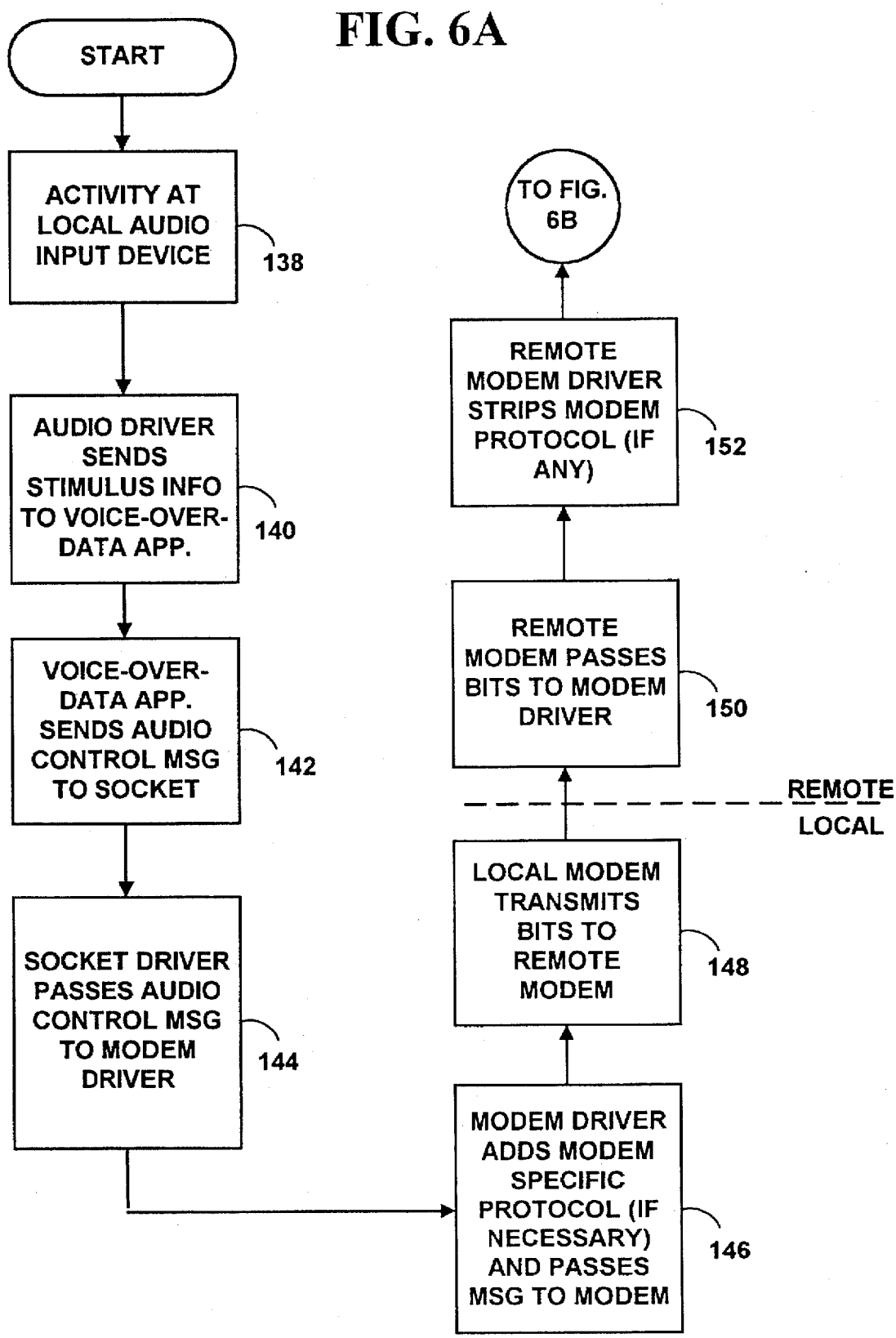
FIGS. 6A and 6B together is a flow chart which illustrates the data path of compression format negotiation message.
Figure 6B:
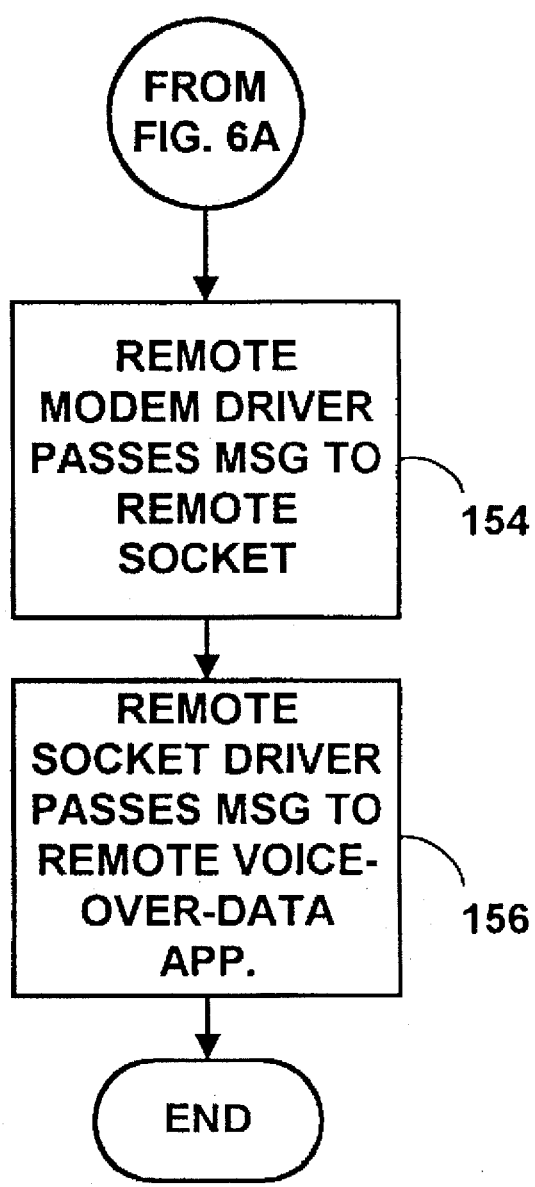

The socket communications setup and compression negotiation will now be explained in more detail. As is shown in the flowchart in FIGS. 6A–B, after a local voice-over-data application has been started, and there is activity at a local audio device 138 (FIG. 6A), an audio information driver (e.g., the WAVE driver) will be stimulated and contact the local voice-over-data application 140. The voice-over-data application will send a special packet of information called a STARTWAVE packet, to a local socket 142. The special audio control packets sent by the WAVE driver have the following format:

```
typedef struct {
        DWORD    dwMessage;
        uchar              uuidProtocol [ ];
        WAVEFORMATEX    wfx;
} WAVESOCKETCONTROL;
``` where dwMessage is of the type STARTWAVE, ACCEPTWAVE, or BADFORMAT, uuidProtocol is the socket UUID and protocol (e.g., datagram or raw), and wfx is the compression format requested by the audio codec. The WAVEFORMATEX data structure is shown below.

where wFormatTag defines the type of WAVE file; nChannels is the number of channels in the wave, 1 for mono, 2 for stereo; nSamplesPerSec is the frequency of the sample rate of the wave file; and nAvgBytesPerSec is the average data rate. The nBlockAlign field is the block alignment (in bytes) of the data; wBitsPerSample is the number of bits per sample per channel data; and cbSize the size in bytes of the extra information in the WAVE format header not including the size of the WAVEFORMATEX structure.

The voice-over-data application sends the audio control message to an audio control socket defined by Windows® 95. Windows® 95 creates a socket for use by audio applications and makes a Universal Unique Id (UUID) (i.e., socket id) known for audio control.

If Windows® 95 had not already created the audio control socket, a socket create() (i.e., a datagram or raw socket) and bind() would have to be done using the UUID (socket id) for use by audio related applications. A socket driver associated with the socket passes the audio control message to a modem driver 144.

Any necessary modem specific protocol is then added by a modem driver 146, and the data is then passed to a local modem which transmits the data to a remote modem 148.

In one embodiment of the present invention, on the remote computer side, an audio server application is "listening" to the audio socket UUID for any input messages. The audio server application is started automatically at boot time when the Windows® 95 operating system boots up. However, the audio server application could also be started after the operating system has booted up on the remote computer. When the STARTWAVE message is received, a remote voice-over-data application would be launched by the audio server application.

Returning to FIG. 6A, when the remote modem receives the data sent to it by the local modem, the reverse operations of those just described take place. The remote modem passes the bits received to a remote modem driver 150 which strips off any modem related protocol 152. The remote modem driver passes the packet to a remote socket 154 (FIG. 6B), and a socket driver passes the audio control message to a remote voice-over-data application 156.

The remote voice-over-data application examines the STARTWAVE message it received from the local voice-over-data application. As is shown in the flowchart in FIGS. 7A–C, if the remote voice-over-data application understands the compression format requested by the local voice-over-data application 158 (FIG. 7A), the remote voice-over-data application replies to the local voice-over-data application with an audio control packet with the dwMessage field set to ACCEPTWAVE 160. The ACCEPTWAVE packet notifies the local voice-over-data application that the given compression format (specified in the wfx field) and UUID have been accepted by the remote application for audio traffic.

If the requested compression format is unavailable for use by the remote codec, then remote application responds with

```
typedef struct waveformat_extended_tag {
        WORD    wFormatTag;      /* format type */
        WORD    nChannels;       /* number of channels (i.e. mono, stereo...) */
        DWORD   nSamplesPerSec;          /* sample rate */
        DWORD   nAvgBytesPerSec;   /* for buffer estimation */
        WORD    nBlockAlign;     /* block size of data */
        WORD    wBitsPerSample;    /* # of bits per sample of mono data */
        WORD    cbSize;              /*The count in bytes of the extra size */
} WAVEFORMATEX;
``` a control packet having the dwMessage set to BADFORMAT, and the wfx field set to the compression format desired by the remote voice-over-application 162.

Figure 7A:
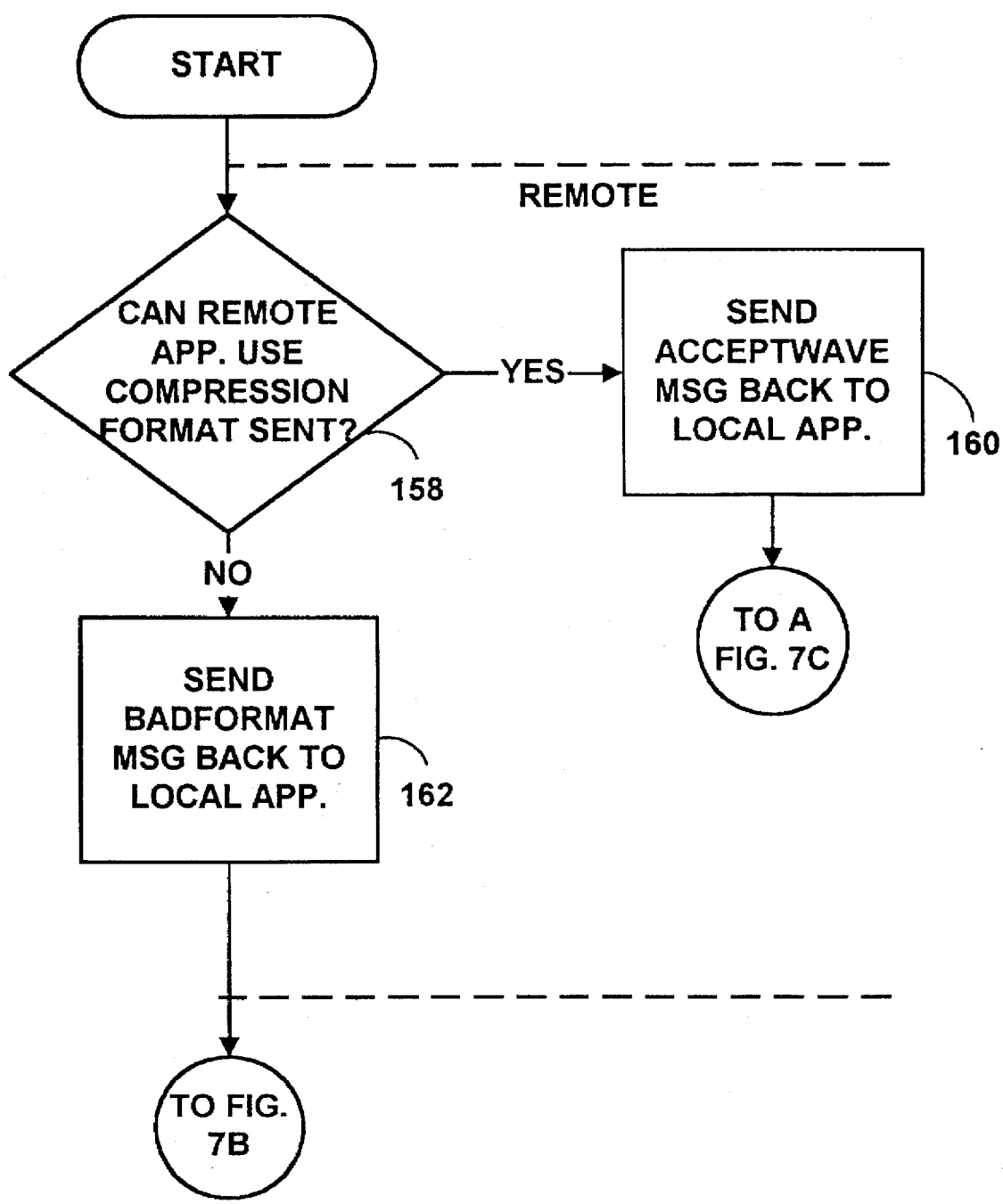
FIGS. 7A, 7B, and 7C together is a flow chart which illustrates the compression format negotiation sequence.
Figure 7B:
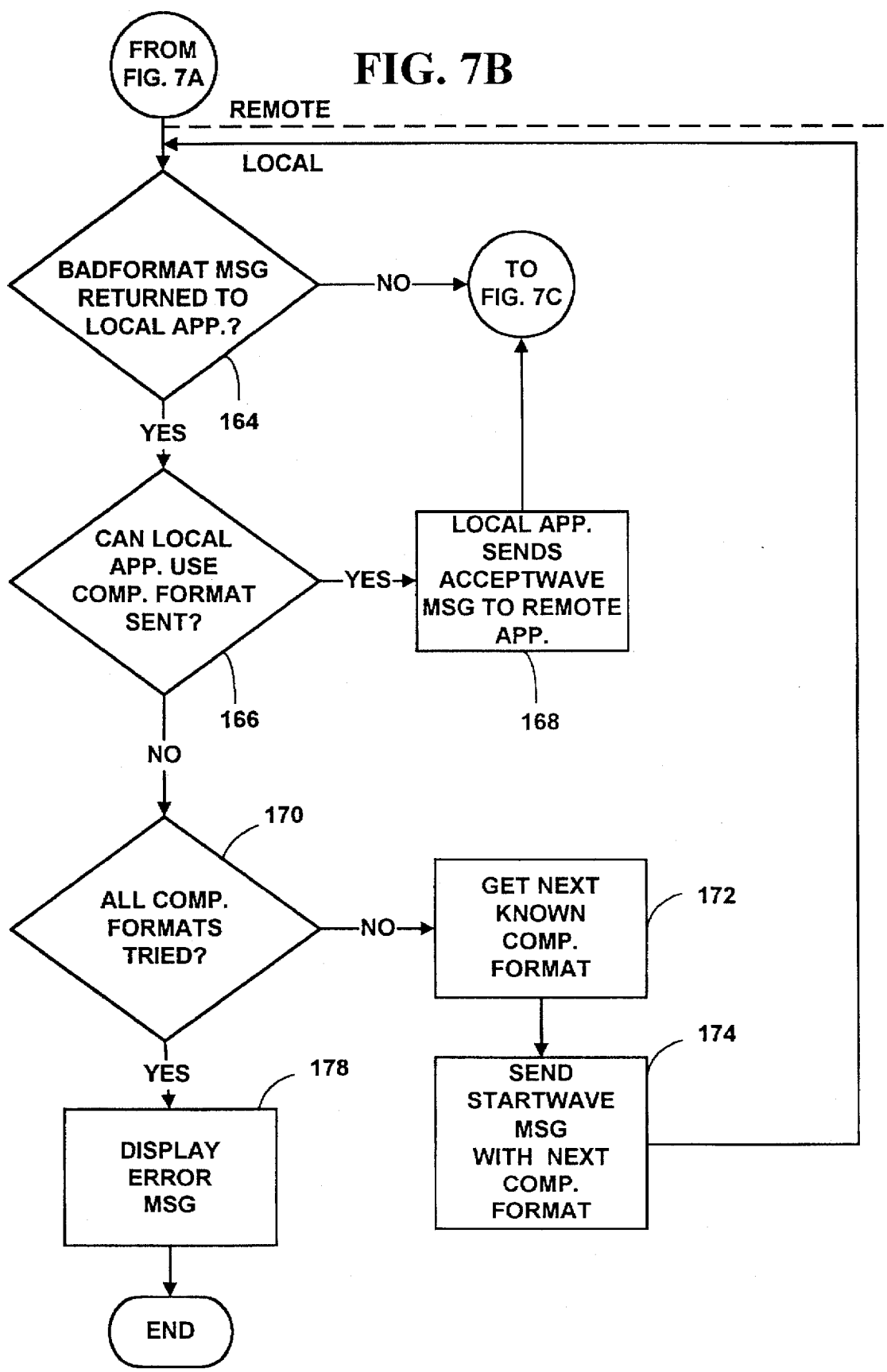

When the local voice-over-data application receives a return message from the remote voice-over-data application, the message type is checked 164 (FIG. 7B). If the return message type is BADFORMAT, then a check is done to see if the local application can use the compression format described in the BADFORMAT return message 166. If the local application can use requested compression format, the local application will send an ACCEPTWAVE packet to the remote application 168. The ACCEPTWAVE packet has the dwMessage set to ACCEPTWAVE, and the wfx set the compression format returned from the remote voice-over-data application.

If the local application doesn't support the requested compression format, it will try to send another compression format it knows about to the remote voice-over-data application. If all known compression formats have not been tried 170, the local voice-over-data application gets the next compression format it knows about 172 and sends a STARTWAVE message with this compression format 174 and waits for a response from the remote voice-over-data application 164. The local voice-over-data application will send additional STARTWAVE audio control messages with a different compression format (170–174) until it exhausts all of its formats, or finds a format acceptable to the remote voice-over-data application 158 (FIG. 7A). If a match is not found, (i.e., the local and remote voice-over-data did not negotiate a compression format), then an error message is printed for the user 178 (FIG. 7B) and socket setup and compression negotiation ends.

In another embodiment of the present invention, all available compression formats are assigned a numerical value. One STARTWAVE audio control message is sent to the remote application with all the numerical values representing known compression schemes to allow a compression scheme to be chosen. The remote application sends back one ACCEPTWAVE message with a prioritized list of numerical values of compression schemes it will accept. If the local application can use any of the codecs in the prioritized list of codecs, another STARTWAVE audio control message is sent with the compression scheme which the local application will use. This embodiment further reduces latency by reducing the number of compression negotiation messages sent.

In yet another embodiment of the present invention, a list of default compression schemes are maintained by the local and remote application. The local application sends a single STARTWAVE message to the remote application requesting one of the default compression schemes. The remote application sends a single ACCEPTWAVE message back to the local application including the default compression scheme which should be used. This embodiment further reduces latency by reducing the number of compression negotiation messages sent.

Figure 7C:
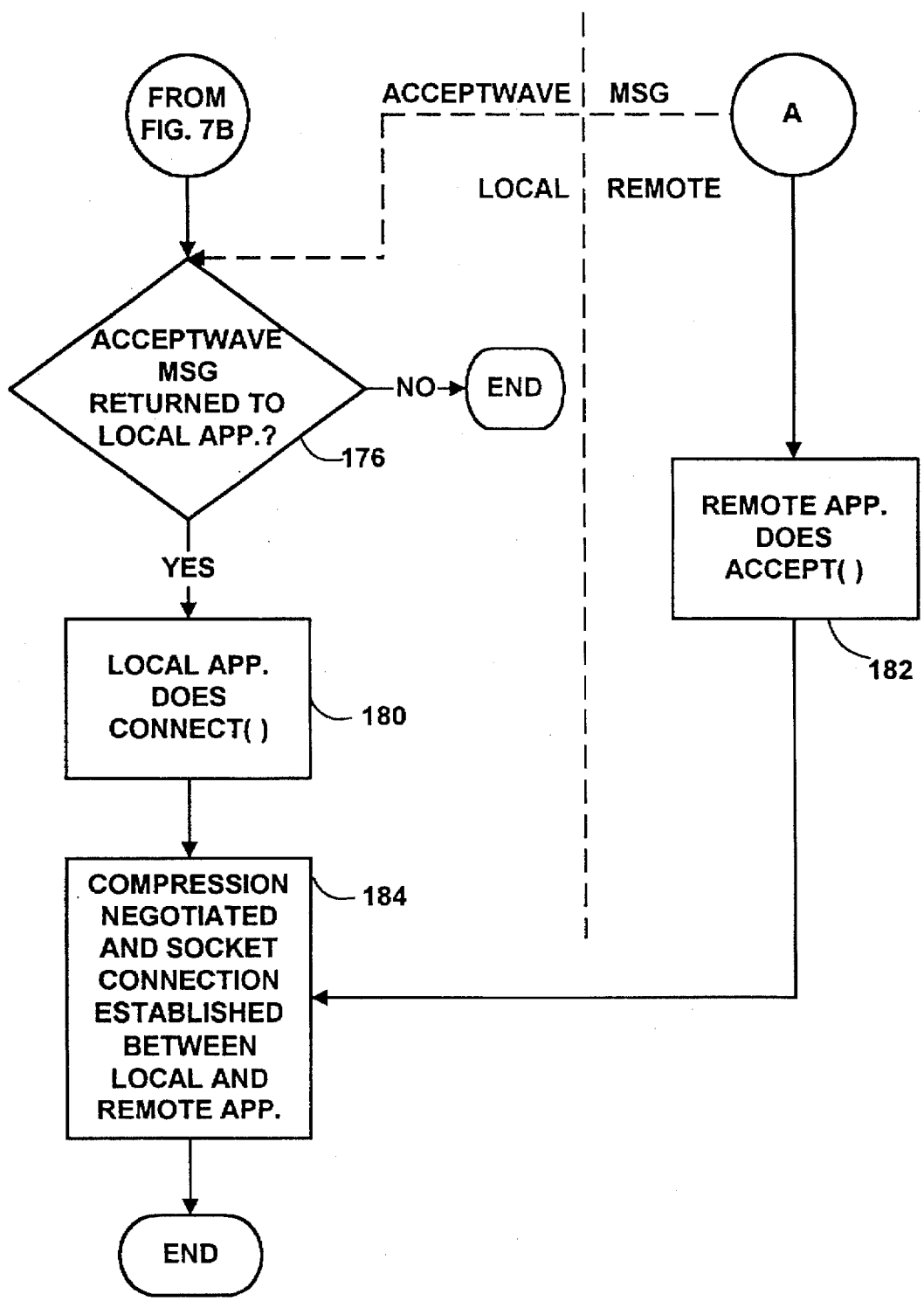

Once the local application receives the ACCEPTWAVE audio packet from the remote application 176, it performs a socket connect() to the UUID returned with the ACCEPTWAVE from the remote machine 180 (FIG. 7C). After sending an ACCEPTWAVE message 160 (FIG. 7A), the remote application performs a socket accept() using the UUID specified in the STARTWAVE packet from the local application 182 (FIG. 7C)

There is now a one-way connection between the local and remote applications which can be used to send audio data from the local to the remote application using the negotiated compression format 184. The socket communications setup and compression negotiation is now complete. If two-way communication is desired, the remote voice-over-data application must initiate its own audio channel, (with the same or a different audio compression format), using the audio control messages and the steps just described.

Two different sampling/compression schemes may also be used over the socket audio channel to allow high quality audio in one direction, and low quality in the other. For example, if a user with a data connection over a modem calls an electronic record store and wishes to sample new CDs, the connection from the record store to the user would be a high quality audio channel to allow high fidelity audio (i.e., compressed with a higher bit-rate codec) to be transmitted. A lower quality (i.e., a lower bit-rate codec) channel might be set up between the user and the electronic record store to permit the user to speak with the record store agent to purchase a CD. However, the local and remote codecs must be capable of understanding both the low and high quality compression formats for this scenario to work.

Figure 8B:
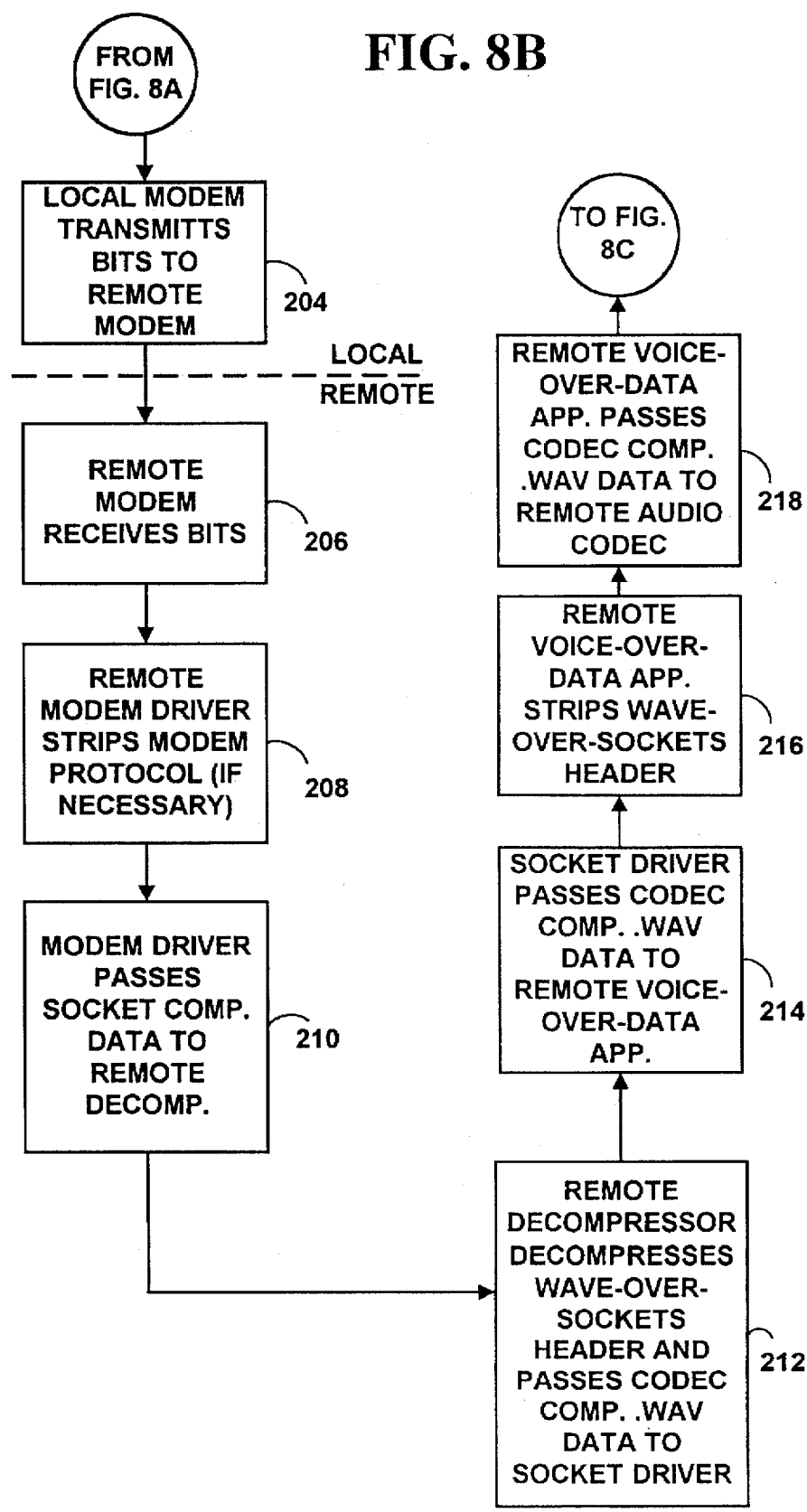
Figure 8C:
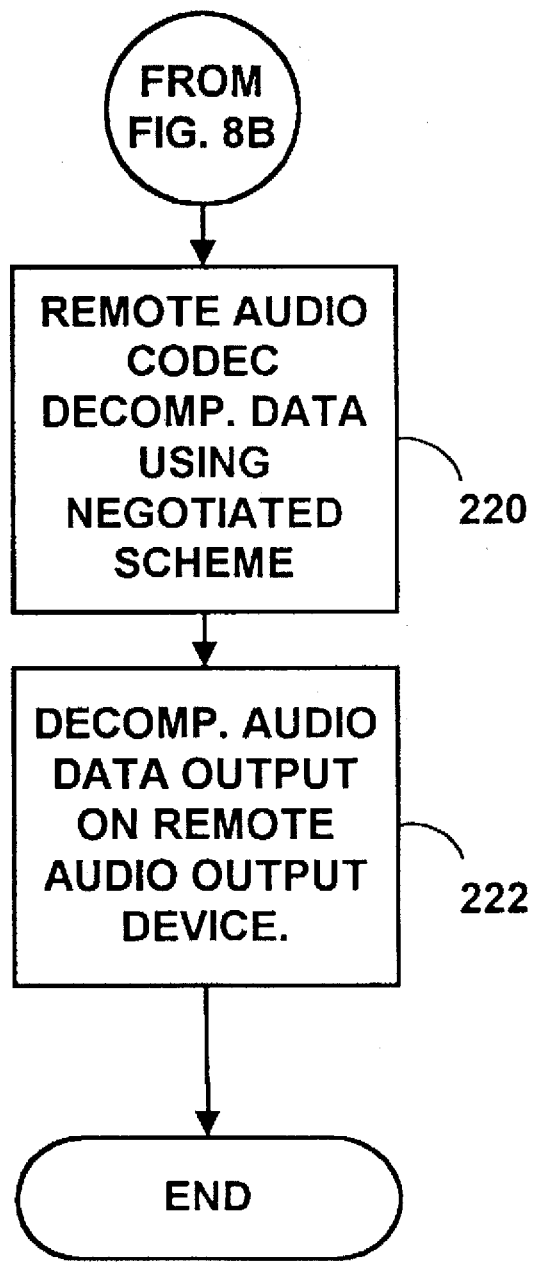

Once a socket connection has been established between the local and remote voice-over-data applications, codec compressed audio data can then be sent using the negotiated format as is shown in the flowchart in FIGS. 8A–8C. Upon further activity at the local audio input device, the audio signal data in digital format is passed by a an audio information driver (e.g., a WAVE driver) to a voice-over-data application 180 (FIG. 8A).

The local voice-over-data application passes the audio signal data to a local audio codec to compress the data 188. The local codec Compressed .WAV data is passed to an audio control socket 190 (which is a datagram or raw socket) using the UUID returned from the negotiations with remote voice-over-data application.

The local voice-over-data application adds a simple header 192, called a wave-over-sockets header, to each packet of codec compressed .WAV audio data received. The wave-over-sockets header has the following format:

```
typedef struct {
    DWORD  dwLength;
    BYTE   data [ ];
}WAVEPACKET;
``` dwLength is the number of bytes in the packet, including the header, and data is the actual codec compressed .WAV data formatted using the WAVEFORMATEX structure for .WAV audio data described above. The local voice-over-data application passes the codec compressed .WAV data with the wave-over-sockets header to the audio control socket 194. The audio control socket passes the codec compressed .WAV data with the wave-over-socket header to a socket driver 196.

The modem socket driver passes the codec compressed .WAV data with the wave-over-socket header to a packet compressor 196 which compress the packet header. The packet compressor then passes the compressed packet (which hereinafter will be called a socket compressed packet to avoid confusion with the codec compress packet) to a local modem driver 198 which makes the packet ready for modem transmission by adding a modem specific protocol 200. (However, adding a modem specific protocol may not be necessary in every instance.) The local modem driver then passes the socket compressed packet to a local modem 202 which transmits the packet as bits to the remote modem 204 (FIG. 8B).

On the remote side, a remote modem receives the bits 206, and a remote modem driver strips any specific protocol information 208. The remote modem device driver then passes the socket compressed packet to a remote packet decompressor 210. The remote packet decompressor decompresses the wave-over-sockets packet header. After decompression, the remote packet decompressor passes the packet to a remote socket driver 212. The packet now consists of an uncompressed wave-over-socket header and the codec compressed .WAV audio information (i.e., the codec compressed .WAV information). The remote socket driver passes the packet to a remote voice-over-data application 214. The remote voice-over-data application strips the wave-over-sockets header 216 and passes the codec compressed .WAV audio information to a remote audio codec 218.

The remote voice-over-data applications passes the codec compressed .WAV audio information to the remote audio codec with instructions on what decompression format to use (FIG. 8C). The audio codec decompresses the compressed audio information using the negotiated decompression format 220 and passes the information to a remote audio output device 222. The remote audio output device will convert the digital information supplied by the codec back into an analog audio signal with an analog-to-digital convertor (ADC). The analog audio signal is then used to output the audio information on an audio output device (e.g., a speaker, telephone, etc.). The steps shown in FIGS. 8A–8C continue as long as there is activity at the local audio input device (e.g., microphone or telephone).

At any time, either side may terminate the audio connection by calling the socket utility close(). The socket connection will then be dropped. Both sides then can then listen to the audio control UUID to see if another connection is desired at some later time.

Using the new scheme for voice-over-data just described, the average latency of 250 millisecond True Speech™ compressed audio packet has been reduced to an average latency of less than 100 milliseconds (plus the compression/decompression time). In contrast, using the voice/data schemes described in the Background section, a 250 millisecond True Speech™ compressed audio packet transmitted over a modem capable of 28,800 bits-per-second transmission, would have an average latency in the 200–300 millisecond range. Thus, the new voice-over-data scheme provides a 300%–400% improvement in latency (which is dependent on the speed of the host computers) and permits voice, with normal speech patterns, to be sent over modem data connection using a standard telephone line.

It should be understood that the programs, processes, or methods described herein are not related or limited to any particular type of computer apparatus, unless indicated otherwise. Various types of general purpose or specialized computer apparatus may be used which perform operations in accordance with the teachings described herein.

Having illustrated and described the principles of the present invention in a preferred embodiment, it should be apparent to those skilled in the art that the embodiment can be modified in arrangement and detail without departing from such principles. For example, elements of the preferred embodiment shown in software may be implement in hardware and vice versa. Hardware and software components can be interchanged with other components providing the same functionality.

In view of the wide variety of embodiments to which the principles of our invention can be applied, it should be understood that the illustrated embodiments are exemplary only, and should not be taken as limiting the scope of our invention.

We therefore claim as our invention all that comes within the scope and spirit of the following claims:

We claim:

1. In a computer system having a first computer in communications with a remote second computer over a data link, a method of creating a virtual two channel audio connection over the data link, the two channel connection including a higher quality audio channel, and a lower quality audio channel, the method comprising the following steps:

maintaining on the first computer a first list of available audio data compression and decompression processes, the first list including higher quality, and lower quality audio data compression and decompression processes;

maintaining on the remote second computer a second list of available audio data compression and decompression processes, the second list including higher quality, and lower quality audio data compression and decompression processes;

negotiating between the remote second computer and the first computer a high quality audio compression and decompression process to be used for the higher quality audio channel and a low quality audio compression and decompression process to be used for the lower quality audio channel;

sending higher quality audio data from the first computer to the remote second computer over the data link using the negotiated high quality audio compression process, the data link thereby serving as a high quality, virtual audio channel; and sending lower quality audio data from the remote second computer to the first computer over the data link using the negotiated low quality audio compression process, the data link thereby also serving as a low quality virtual audio channel.

2. A computer readable medium having stored therein instructions for causing the first computer to perform the method of claim 1.

3. The method of claim 1 wherein the lower quality audio channel is used to send voice data.

4. The method of claim 1 where the first list of available audio data compression and decompression processes on the first computer is identical to the second list of available audio data compression and decompression processes on the remote second computer.

5. The method of claim 1 where the first list of available audio data compression and decompression processes on the first computer is not identical to the second list of available audio data compression and decompression processes on the remote second computer.

6. The method of claim 1 in which said data link serves concurrently to provide both said higher quality and lower quality virtual audio channels.

7. The method of claim 1 which includes employing a socket to establish the data link.

8. The method of claim 7 wherein the step of establishing an audio connection using a socket includes using a datagram socket.

9. The method of claim 1 wherein the high quality audio data is sampled at a rate greater than 11 KHz.

10. The method of claim 1 wherein the low quality audio data is sampled at a rate less than or equal to 11 KHz.

11. The method of claim 1 further comprising:

maintaining on the remote second computer a second list of available audio data compression and decompression processes, the second list including at least one but less than all of the high quality, and low quality audio data compression and decompression processes contained in the first list.

12. In a system having a first computer in communications with a second remote computer over a data link, a method of establishing a virtual plural channel audio connection therebetween, where each of said audio channels is capable of sending two or more streams of compressed audio data, the method comprising the following steps:

negotiating between the first computer and the remote second computer a number of audio channels to establish, wherein said number of audio channels is two or more;

negotiating between the first computer and the remote second computer an audio data compression and decompression process for each of said number of audio channels;

transmitting audio data from the first computer to the remote second computer in two or more compressed audio data streams over each of said virtual audio channels using the audio compression process negotiated therefor.

13. The method of claim 12 which includes employing a socket to establish the data link.

14. The method of claim 13 wherein said socket is a datagram socket.

15. The method of claim 12 wherein the virtual audio channels are used to provide audio location cues for teleconferencing.

16. The method of claim 12 wherein the virtual audio channels are used to provide full spatial imaging cues for teleconferencing.

17. A computer readable medium having stored therein instructions for causing a first computer to perform the method of claim 12.

* * * * *